United States Patent [19]

Aldissi et al.

[11] Patent Number: 4,503,205
[45] Date of Patent: Mar. 5, 1985

[54] METHOD OF MAKING SOLUBLE POLYACETYLENIC AND POLYAROMATIC POLYMERS

[75] Inventors: Mahmoud Aldissi; Raimond Liepins, both of Los Alamos, N. Mex.

[73] Assignee: The United States of America as represented by the United States Department of Energy, Washington, D.C.

[21] Appl. No.: 562,243

[22] Filed: Dec. 16, 1983

[51] Int. Cl.$^3$ .......................... C08F 4/06; C08F 4/00; C08F 4/14; C08F 38/00; C08F 138/00; C08F 238/00; C08F 210/00; C08G 65/38

[52] U.S. Cl. .................................. 526/221; 526/237; 526/285; 526/348; 528/217; 528/381; 528/392; 528/396; 585/505; 585/510; 585/520

[58] Field of Search ....................... 526/221, 237, 285; 528/392, 217, 381, 396; 585/505, 510, 520

[56] References Cited

U.S. PATENT DOCUMENTS 4,321,114  3/1982  MacDiarmid et al. ............. 204/2.1

FOREIGN PATENT DOCUMENTS 0053669  8/1981  Fed. Rep. of Germany ...... 528/392

OTHER PUBLICATIONS

Lagowski, "The Chemistry of Non-Aqueous Solvents", pp. 6–11, Academic Press (1966).
Aldissi, M., "Review of the Synthesis of Polyacetylene and its Stabilization to Ambient Atmosphere".
Aldissi, M. and Liepins, R., "Synthesis of Soluble Conducting Polymers-Polyacetylenes and Polyaromatics", (unpublished).
MacDiarmid et al., "Recent Advances in the Chemistry and Physics of Polyacetylene: Solitons as a Means of Stabilizing Carbonium Ions and Carbanions in Doped $(CH)_x$", (1981).
"Cadmium Sulfide Polyacetylene Photovoltaic Heterojunction", Cadene et al. (5/82).
"Semiconductor Properties of Polyacetylene p-$(CH)_x$: n-CdS Heterojunctions", Ozaki et al.; J. Appl. Phys. 51(8), 8/80.

Primary Examiner—Harry Wong, Jr.
Assistant Examiner—Fred Teskin
Attorney, Agent, or Firm—William A. Eklund; Paul D. Gaetjens

[57] ABSTRACT

A soluble polyene polymer and a method of making the same are disclosed. The polymer is of the class suitable for doping to produce an electrically conductive polymer. The method is generally applicable to acetylenic and aromatic monomers, proven examples of which include acetylene, benzene, anthracene and napthalene. In accordance with the method, the monomer is dissolved in arsenic trifluoride. Arsenic pentafluoride is then introduced into the solution to induce polymerization by what is speculated to be an ionic polymerization reaction. The resulting polymer differs from other polyene polymers in that it is soluble in common organic solvents, and further in that it can be melted without undergoing decomposition, thereby rendering it particularly suitable for processing to form various polymeric articles.

7 Claims, No Drawings

METHOD OF MAKING SOLUBLE POLYACETYLENIC AND POLYAROMATIC POLYMERS

This invention is the result of a contract with the Department of Energy (Contract No. W-7405-ENG-36).

BACKGROUND OF THE INVENTION

The invention described herein is generally related to polyacetylenic and polyaromatic polymers, particularly those suitable for doping to produce electrically conductive polymers.

Certain polyacetylenic and polyaromatic polymers have been of considerable interest since the recent discovery that the electrical conductivity of such polymers can be significantly increased by doping them with various dopants, as described for example in the U.S. Pat. No. 4,321,114 to MacDiarmid et al. In some cases, the doped polymers exhibit electrical conductivities comparable to that of metals. Although polyacetylene is the most studied conductive polymer, the polyaromatics such as polyparaphenylene are also of interest because it is known that they can in some cases also be made electrically conducting by doping.

Polyacetylene occurs in the cis- and trans-isomeric forms, which are represented as follows:

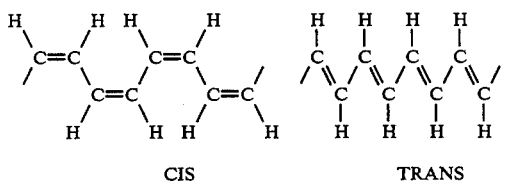

CIS             TRANS

The cis-isomer is generally stable only at low temperatures and can be converted to the trans-isomer (the thermodynamically more stable form) by heating at 150°–180° C. for 30 minutes to 1 hour.

As discussed further below, polyacetylene is generally formed as thin plastic film. Electron microscopy studies show that the film consists of randomly oriented fibrils, the diameter of which depends on the reaction conditions under which the film was prepared. X-ray diffraction analyses indicate that the films are polycrystalline, with the principal interchain spacing being on the order of 4.39 Angstrom. Films in the cis-isomeric form are relatively flexible and can be stretched at room temperature up to three times their original length, with partial alignment of the fibrils resulting. Films in the trans-isomeric form are more brittle and can be stretched only to a very small extent.

All of the previously known polyacetylene films are insoluble in common solvents. They are also thermally unstable, decomposing rather than melting upon being heated. These characteristics represent the primary difference between the previously known polyacetylenes and the polyacetylene of the present invention, which is soluble in a number of common organic solvents and which can be melted without decomposing. This is considered to be an important difference, inasmuch as it renders possible the manufacture of electrically conductive polyacetylenes which are thermoplastic, and can thus be formed into various shapes by common thermoplastic forming techniques, and which are also soluble in common solvents, also greatly enhancing the utility of the material in forming various types of electrically conductive polymeric articles.

Polyacetylenes have been previously synthesized primarily by the use of what are known as Ziegler-Natta catalysts. Such catalysts are generally transition metal derivatives complexed or reduced by an organometallic compound. A primary example of such a catalyst is the mixture of triethylaluminum (($C_2H_5$)$_3$Al) and tetra-n-butoxy titanium ((n—$C_4H_9$O)$_4$Ti). A polyacetylene film may be produced by wetting the interior walls of a glass reaction vessel with a toluene solution of this catalyst and then admitting gaseous acetylene at any pressure between a few centimeters Hg and one atmosphere. The gaseous acetylene is polymerized and deposited as a film on the surface of the wetted vessel walls over a period of a few seconds to an hour, depending on the acetylene pressure and the temperature. The film can be washed, dried, and readily peeled from the surface of the vessel. The film can thus be removed as a free-standing film or can be left in place on the substrate surface. The thickness of the film can be varied from $10^{-5}$ cm up to approximately 0.5 cm depending on the reaction conditions. If polymerization is conducted at a temperature below $-78°$ C., the film is formed predominantly in the cis-isomeric form. If polymerization is conducted at room temperature, a mixture consisting of 60% cis- and 40% trans-isomeric form is obtained. At a temperature of 150° C. (using a decane solvent), the trans-isomer is formed exclusively. As noted above, the cis-isomer can be readily converted to the trans-isomer simply by heating.

The electrical conductivity of undoped polyacetylene films depends on the cis-trans content of the film, ranging from $10^{-5}$ (ohm-cm)$^{-1}$ for the trans-isomer to $10^{-9}$ (ohm-cm)$^{-1}$ for the cis-isomer. The more conductive trans-isomer is considered to be a semiconductor, as conductivities in the $10^{-5}$ to $10^{-6}$ (ohm-cm)$^{-1}$ range are generally considered to be in the semiconductor range. The band gap of the trans-isomer is approximately 1.4 electron volts, which is also similar to that of common semiconductors such as amorphous silicon, cadmium sulfide and zinc sulfide. However, the measured conductivities of the trans- and cis-isomers are believed to represent the conductivities of the polymers as contaminated with trace amounts of aluminum and titanium remaining from the catalyst used to induce polymerization. The conductivities of the pure polymers are believed to be considerably lower and have not been accurately determined due to the practical difficulty of obtaining uncontaminated polyacetylene films.

The conductivities of polyacetylene films can be significantly increased by doping them with various types of dopants. Doping of polyacetylene has been known to increase the electrical conductivity to as high as approximately 1000 (ohm-cm)$^{-1}$, which is comparable to the conductivity of metallic mercury. Either n- or p-type dopants can be utilized. Doping is typically achieved by exposing the film to a vapor or solution of the dopant. For example, polyacetylene films can be doped by exposure to the vapor of an electron-attracting (p-type) substance such as $Br_2$, $I_2$, $AsF_5$, $H_2SO_4$, or $HClO_4$. Alternatively, the film can be doped with an electron-donating (n-type) dopant, for example by immersing the film in a solution of sodium naphthalide in tetrahydrofuran.

As already noted, the previously known polyacetylene and polyaromatics are generally insoluble and cannot be melted without decomposing. These characteristics have heretofore placed substantial limitations on the extent to which these materials can be processed to form useful, electrically conductive, nonmetallic articles.

SUMMARY OF THE INVENTION

Accordingly, it is an object and purpose of the present invention to provide soluble polyacetylenic and polyaromatic polymers and a method of making the same.

To achieve the foregoing and other objects, and in accordance with the purposes of the present invention, as embodied and broadly described herein, the method of the present invention comprises the steps of forming a solution of an acetylenic or a nonsubstituted aromatic monomer in arsenic trifluoride ($AsF_3$), followed by the introduction into the solution of arsenic pentafluoride ($AsF_5$). Polymerization of the monomer is spontaneous upon introduction of the $AsF_5$. The resulting polymer is deposited initially as a film on the surface of the solution and may thereafter accumulate in a bulk phase, depending on the concentration of the monomer in the solution, the pressure of the $AsF_5$, and other reaction conditions. The resulting polymer is soluble in common organic solvents, including acetone, methylene chloride, dimethyl sulfoxide, benzene and toluene. Additionally, the resulting polymer can be heated to melting without decomposing. These latter characteristics relating to solubility and melting distinguish the polymer from previously known polyacetylenic and polyaromatic polymers, and are believed to be a consequence of the novel method by which the polymer is made.

Where the monomer is a gas, such as acetylene, the solvent $AsF_3$ may preferably be cooled below the melting point of the monomer. The gaseous monomer is introduced into the $AsF_3$ and condensed in the solid phase. Upon introduction of the catalyst $AsF_5$, the polymer is deposited homogeneously throughout the solvent. After polymerization is complete, the $AsF_5$ may be selectively removed by evacuation at low pressure, and the solvent $AsF_3$ may be subsequently removed by distillation, leaving the polymer as a homogenous film.

DETAILED DESCRIPTION OF THE INVENTION $AsF_3$ melts at $-8.5°$ C. and boils at $63°$ C. $AsF_5$ melts at $-80°$ C. and boils at $-53°$ C. As used in the present invention, the $AsF_5$ is a polymerization initiator, or catalyst. As noted above, $AsF_5$ has previously been used as a p-type dopant for the previously known polyacetylenes, but in the present invention it is used in a different capacity as a catalyst.

In accordance with the preferred embodiment of the method of the invention, an acetylenic or aromatic monomer is mixed with $AsF_3$, preferably at a temperature below the melting point of the monomer. Such a temperature is preferred in order to minimize the amount of monomer vapor that is present in the system above the $AsF_3$/monomer mixture, thereby avoiding polymeric condensation of the gaseous monomer on the walls of the reaction vessel during the polymerization step discussed below. The $AsF_3$/monomer mixture may be a liquid solution, or, if the melting point of the monomer is relatively low, may be a solid mixture. The mixture is then exposed to gaseous $AsF_5$ to induce polymerization of the monomer. If the mixture is frozen at the initial exposure temperature, it is gradually melted while being exposed to the $AsF_5$ vapor. Polymerization is spontaneous upon exposure to the gaseous $AsF_5$ and is ordinarily complete within ten minutes. When polymerization is complete, the $AsF_5$ and $AsF_3$ may be separated from the polymer by vacuum distillation, in separate steps if it is desired to separate the $AsF_5$ from the $AsF_3$. The resulting polymer is soluble in common organic solvents and can ordinarily be melted without undergoing decomposition.

EXAMPLE 1

In a demonstration of the method of the invention, 5 mls of liquid $AsF_3$ was placed in a 100 ml reaction vessel and cooled to $-95°$ C. with a dry ice/methanol bath. The vessel was swirled during cooling in order to freeze the $AsF_3$ in a thin solid layer spread over the interior surface of the vessel. Gaseous acetylene was continuously admitted to the vessel at a pressure of 50 cm Hg as the $AsF_3$ was cooled, such that a portion of the acetylene was dissolved in the liquid $AsF_3$ prior to its solidification and a portion of the acetylene was condensed as a separate solid phase after solidification of the $AsF_3$. The amount of acetylene introduced into the vessel in this manner was approximately 0.5 gm, or approximately 200 ml of gaseous acetylene at a pressure of 50 cm Hg. The system was then evacuated while the frozen $AsF_3$/acetylene mixture was maintained at $-95°$ C. Approximately 100 mls of gaseous $AsF_5$ at a pressure of 40 cm Hg was then introduced into the vessel and allowed to condense until the $AsF_5$ pressure dropped to approximately 20 cc Hg. after which the system was evacuated to remove the remaining gaseous $AsF_5$. Immediately upon the introduction of the $AsF_5$ the solid $AsF_3$/acetylene/$AsF_5$ mixture assumed a dark color, indicating at least some preliminary formation of polyacetylene while the $AsF_3$/acetylene mixture was still frozen. The vessel and its contents were then allowed to warm to room temperature, at which time the melted solution was observed to be maroon-colored due to the presence of polyacetylene. The solution was then cooled to below $-8.5°$ C. to freeze the $AsF_3$/polymer solution, and the system was evacuated to remove gaseous $AsF_5$ released from the solution by evaporation in the previous warming step. The vessel was then again warmed to room temperature and the $AsF_3$ was drawn off by vacuum distillation, leaving behind only the solid brown polymer. Yield was approximately 0.5 gm of a brown polymer which is soluble in common organic solvents and which is maroon-colored in solution. Preliminary gel phase chromatographic analyses of the polymer indicated a range of molecular weights of from 50 to 10,000, which is substantially less than the estimated molecular weight of approximately 30,000 for polyacetylenes prepared by previously known methods. Infrared spectra of the polyacetylene showed a strong peak at 700–740 $cm^{-1}$, which is attributed to the C-H out-of-plane bending mode in the cis-polyacetylene, and two small peaks at 1175 and 900 $cm^{-1}$, which are considered characteristic of a slightly doped polyacetylene. Elemental analysis of the polymer indicated a C/H ratio of 1.036. Protonic NMR spectra showed several peaks in the range of 3.5 to 5.5 ppm, which is characteristic of the conjugated double bonds of the polyacetylene. The polyacetylene was cast as a film from solution to measure electrical conductivity, which was measured to be $10^{-6}$ to $10^{-7}$ $(ohm\text{-}cm)^{-1}$. Such a conductivity is considered characteristic of a slightly doped cis-polyacetylene.

EXAMPLE 2

In another demonstration, acetylene was introduced at a pressure of 40 cm Hg into a vessel containing 5 mls $AsF_3$ at room temperature. $AsF_5$ was then introduced at a pressure of 30 cm Hg. All other conditions and procedures were as described above in Example 1. Yield was approximately 0.5 gm of a brown polymer with substantially the same characteristics as described above.

EXAMPLE 3

In another demonstration, acetylene was introduced at a pressure of 20 cm Hg into a vessel containing 5 mls of $AsF_3$ maintained a temperature of $-198°$ C. with liquid nitrogen. $AsF_5$ was then introduced at a pressure of 15 cm Hg. All other conditions and procedures were as described above. Yield was again approximately 0.5 gm of a solid brown polymer which is maroon-colored in solution.

EXAMPLE 4

Five milliliters of benzene was mixed with five milliliters of arsenic trifuloride by vacuum distillation of the benzene into a reaction vessel containing the $AsF_3$ maintained a temperature of $-95°$ C. with a dry ice/methanol bath. The frozen mixture was then warmed to a temperature of between $-8.5°$ and $5.5°$ C., which is below the melting point of benzene and above the melting point of $AsF_3$. In this manner, it was ensured that there was little benzene in the vapor phase, which could be polymerized in an insoluble form on the walls of the vacuum system. $AsF_5$ was then introduced at a reduced pressure of approximately 40 cm Hg. The $AsF_5$ and $AsF_3$ were then removed by vacuum distillation in the manner described above. A brown polymeric polyparaphenylene was obtained, which was demonstrated to the soluble in common organic solvents. Gel phase chromatographic analysis indicated approximately the same molecular weight distribution as obtained in the case of the polyacetylenes.

EXAMPLE 5

A form of polymeric polyanthracene was formed by the method of the invention. Approximately 1.5 gm of solid anthracene was loaded into an empty reaction vessel. The system was then evacuated and five milliliters of $AsF_3$ were vacuum distilled into the reaction vessel. The mixture was then exposed to $AsF_5$ at a pressure of 40 cm Hg, while being maintained at a temperature of 0.0° C. The $AsF_3$ and $AsF_5$ were then removed as described above, leaving a dark green polymeric form of polyanthracene.

EXAMPLE 6

In another example, 1.0 gm of napthalene was polymerized in the same manner as described above in Example 5, using however three milliliters of $AsF_3$. Upon exposure of the napthalene/$AsF_3$ solution to the $AsF_3$, the solution turned pink after a few seconds and then changed to a dark green color over a total exposure time of about 10 minutes. The resulting polymer was dark green both in solution and in the solid phase. Essentially 100% yield of the dark green polymeric form of napthalene was obtained.

Although polymeric polyparaphenylenes and other polyaromatics have previously been made through a Friedel-Crafts reaction, the polyaromatics made by the present invention are soluble in ordinary solvents whereas the previously known polyparaphenylenes are insoluble.

It is speculated that the polymer of the present invention is soluble because it is of a shorter average chain length than the polymer as prepared by previously known methods. It is further speculated that the shorter chain length is a result of the polymerization occurring by an ionic, rather than coordinative, polymerization mechanism. It is also thought possible that the polymers of the present invention are characterized by relatively less cross-linking. In any event, these conjectures merely represent the reasoned speculation of the applicant, and are not intended to limit the invention in any way.

In view of the results of the experiments described above, it is believed that the method of the present invention is generally applicable to aromatic and acetylenic compounds generally, including also such compounds as phenylene sulfide, phenylene oxide, and the pyrroles. Accordingly, although the present invention is described with reference to the examples set forth above, the scope of the invention is limited only by the following claims.

What is claimed is:

1. A method of producing a soluble polymer, comprising the steps of:
   forming a solution of arsenic trifluoride and a monomer selected from the group consisting of acetylenic and nonsubstituted aromatic monomers and mixtures thereof; and
   introducing into said solution an amount of arsenic pentafluoride sufficient to induce polymerization of said monomer in said solution.

2. The method claim 1 wherein said monomer is acetylene and wherein said solution is formed by introducing the acetylene in the gaseous state and under reduced pressure into said arsenic trifluoride.

3. The method defined in claim 1 wherein said arsenic pentafluoride is introduced at a temperature of between 25° C. and −90° C.

4. The method defined in claim 1 wherein a solution of benzene in arsenic trifluoride is formed.

5. The method of claim 4 wherein said solution of benzene and arsenic trifluoride is maintained at a temperature of between approximately −8.5° and 5.5° C., and wherein said arsenic pentafluoride is introduced in the gaseous state at reduced pressure.

6. The method defined in claim 1 wherein a solution of napthalene in arsenic trifluoride is formed.

7. The method defined in claim 1 wherein a solution of anthracene in arsenic trifluoride is formed.

* * * * *